3,565,991
METHODS FOR USE AND COMPOSITIONS OF 17α-ETHYL-19-NORTES-TOSTERONE AND CARRIERS FOR THE SUSTAINED RELEASE OF STEROIDS
George E. Short, Arlington Heights, Ill., assignor to G. D. Searle & Co., Chicago, Ill., a corporation of Delaware
No Drawing. Filed Apr. 22, 1968, Ser. No. 723,284
Int. Cl. A61k 17/06, 27/12
U.S. Cl. 424—243                      3 Claims

ABSTRACT OF THE DISCLOSURE

A method of controlling ovulation and estrus in bovines by the parenteral administration of 17-α-ethyl-19-nortestosterone. Compositions containing 17-α-ethyl-19-nortestosterone for parenteral administration. Carriers for the sustained relase of steroids comprising the steroid dispersed in a copolymer of a monoester of an olefinic acid and a diester of an olefinic acid.

---

This invention relates to methods of treating female bovines with 17α-ethyl-19-nortestosterone, administered parenterally, to control ovulation and estrus, and to compositions for use in such methods. This invention also provides novel compositions comprising 17α-ethyl-19-nortestosterone and other steroids dispersed in a copolymer of a major amount of a monoester of an olefinic acid, either acrylic or methacrylic acid, and a minor amount of a diester of one of said acids. These polymers per se and their manner of preparation are generally described in United States Pat. Nos. 2,976,576 and 3,220,960 except that in this invention water is not used in the mixture for polymerization and the steroid is added to the mixture for polymerization.

The 17α-ethyl-19-nortestosterone is prepared in accordance with methods disclosed in the literature, suitably by the methods described in United States Pat. No. 2,721,871.

Progestational steroids have been administered to domestic animals orally and parenterally for various purposes, including the control of ovulation and estrus. One purpose of such control is to attain near simultaneous release of ovulation and estrus in large numbers of cycling animals following cessation of treatment, thus facilitating controlled breeding, e.g. breeding by an artificial insemination, natural service or hand service. Another important purpose is to induce ovulation in acyclic animals, such as animals which have recently borne young and animals having impaired fertility resulting from neurohormonal imbalances or deficiencies resulting in failure to cycle.

The desirable compound for controlling ovulation and estrus is one effective at low dosage, which is able to release ovulation and estrus nearly simultaneously within a short, predeterminable period after discontinuance of its use, and which does not interfere with subsequent fertility, particularly on the first post-treatment cycle.

Previously, a number of progrestational steroids have been used to control estrus and ovulation. These compounds were often used by the oral route of administration, suitably by mixing the compound with the feed. Problems have been encountered with such compounds involving either a too long acting effect, undesired variability in the time of release of volulation and estrus, or impaired fertility at the first post-treatment cycle. Additionally, the practice of mixing the compound with the feed resulted in variations attributed to differences in the food intake from animal to animal and also made synchronization by this means unsuitable for range cattle.

In accordance with this invention, it has been found that 17α-ethyl-19-nortestosterone, generically termed norethandrolone, a steroid having a combination of progestational, anabolic and anti-estrogenic properties, can be used parenterally to control ovulation and estrus in bovines at doses as low as about 5 mg. per day and permits the near simultaneous release of estrus and ovulation within an optionally short, predeterminable period after discontinuaance of its use. In addition, the compound has been used to control estrus and ovulation without impairment of—and in some cases—with increased fertility, particularly on the first post-treatment cycle. This discovery is particularly surprising in view of the fact that 17α-ethyl-19-nortestosterone has been found ineffective orally to prevent estrus and ovulation in cows when administered at doses up to 96 mg. per day. This discovery is also surprising in view of the lowered fertility on the first post-treatment cycle, long periods of anestrus or frequently recurring estrus often found when the structurally related 17-α-ethynyl-17β-hydroxyestr-5 (10)-en-3-one, or a mixture thereof with about 1.5% of ethynylestradiol 3-methylether, has been used.

In accordance with this invention it has further been found that water insoluble or sparingly soluble steroids can be dispersed in a copolymer of a major amount of a monoester of acrylic or methacrylic acid and a minor amount of a diester of one of said acids, to provide a preparation suitable for the sustained release of that steroid, desirably upon subcutaneous administration.

In accordance with this invention the norethandrolone is made up for parenteral administration by incorporation into a pharmaceutically acceptable carrier. Suitable pharmaceutically acceptable carriers for injection include water, edible oils, alcohols, glycols and oil and water-base pastes of polyglycols. Such carriers may additionally include isotonic and suspending agents, surfactants, preservatives, bactericidal and bacteriostatic agents. Suitable pharmaceutically acceptable carriers for implantation include nontoxic diluents and bulking agents, and solid porous materials such as silicone rubber and polyurethane, in which the steroid is dispersed.

Especially useful carriers for norethandrolone and other water insoluble or sparingly soluble steroids are copolymers of a major amount of a monoester of an acrylic or methacrylic acid, and a minor amount of a diester of one of said acids. These copolymers are generally described in United States Pat. Nos. 2,976,576 and 3,220,960 but are prepared without the use of water in the polymerization mixture and with the addition of the steroid to the polymerization mixture. The subcutaneous implantation of such a carrier containing 17α-ethyl-19-nortestosterone has been found to permit the controlled release of that steroid throughout a given treatment period.

The monoester monomers for use in preparing the aforementioned copolymers have a single double bond and contain a cationic or anionic ionizable hydrophilic group or contain a non-ionizable hydrophilic group. Typical cationic monomers include the dimethylaminoethyl, piperidinoethyl, and morpholinoethyl acrylates and methacrylates. Anionic monomers include methacrylyl glycolic acid. Monomers with non-ionizable hydrophilic group include the monomethylacrylates and monoacrylates of glycols, glycerol, di- and polyalkylene glycols, and other polyhydroxylic compounds. The diester monomers for use in preparing the copolymer have two double bonds and contain either an ionizable hydrophilic group or a non-ionizable hydrophilic group. The diester monomers having a cationic ionizable hydrophilic group include the dimethacrylates and acrylates of triethanolamine; monomers with ionizable anionic hydrophilic groups include diacrylates and dimethacrylates of tartaric acid. The diester monomers with non-ionizable hydrophilic group include the diacrylates and dimethylacrylates of glycols, glycerol, di- and polyalkylene glycols, and other polyhydroxylic compounds, including ethylene glycol and triethylene glycol.

The water insoluble or slightly soluble steroids for dispersion in the copolymer include progestins such as progesterone, and 9α-halo steroids of the formula

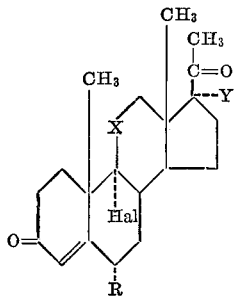

wherein X is a β-hydroxymethylene or carbonyl radical, Hal is a fluoro, chloro or bromo atom, Y is hydrogen or a lower alkanoyloxy radical and R is hydrogen or the methyl radical. Other suitable progestational steroids include the 6-methyl and/or the 17α-lower alkanoyloxy analogs of progesterone, 17α-ethynylestr-4-ene-3β,17β-diol 3,17-diacetate, 17α - acetoxy-6-methylpregna-4,6-diene-3, 20-dione, 17β-hydroxy-17α-methallylestr-4-en-3-one, 6α, 17α - (methylphenylmethylenedioxy)-preg - 4 - ene-3,20-dione, 3β,17β-dihydroxy-17α-methallylestr-4-ene 3-acetate, 9β,10α-pregna-4,6-diene-3,20-dione, 17α - ethynyl-17β-hydroxy-13β-ethylgon-4-en-3-one, 17α-lower alkyl-6-methyl-pregna-4,6-diene-3,20-diones, 17α - lower alkanoyloxy-6-halo-1α,2α - methylenepregna-4,6-diene-3,20-diones, 17α-lower alkanoyloxy-6α-methylpreg-4-en-20-ones, 3β,17α-di (lower alkanoyloxy)-6α-methylpregn-4-en-3,20-diones and 17α - lower alkanoyloxy-6-halopregna-4,6-diene-3,20-diones. Likewise there can be dispersed in the copolymer estrogenic steroids such as estradiol, 17α-ethynylestradiol 3-methyl ether, etc.; and rogenic and anabolic steroids such as testosterone, methyltestosterone, 2α-methyl-dihydrotestosterone propionate, 9α-fluoro-11β-hydroxy-17α-methyltestosterone, Δ¹-17α-methyltestosterone etc.; and natural and synthetic mineralo and glucocorticoids and their antagonists such as desocycorticosterone, aldosterone, corticosterone, cortisone, hydrocortisone, prednisolone and its lower alkyl esters, etc.

The implants are prepared by warming a major amount of the monoester of acrylic or methacrylic acid, a minor amount of the diester of one of said acids and the steroid, desirably in the presence of a conventional polymerization catalyst to effect polymerization of the mixture. So that the copolymer is sparingly cross-linked, the amount of diester is preferably less than one percent of the monoester weight.

The dosage of norethandrolone to be administered to the bovine depends on the weight and condition of the animal to be treated, the route of administration and the nature of the desired results. Where it is desired to control estrus and ovulation in a cycling animal or an acyclic animal that has recently borne young, the desirable dosage to permit the release of ovulation and estrus within a few days after termination of treatment is about 5 milligrams per day, desirably given over about a 16-day treatment period. Where the compound is to be used to control ovulation and estrus by the induction thereof in animals having impaired fertility due to neurohormonal imbalances, the norethandrolone is desirably administered in a single dose of at least 50 milligrams or can be used as with the cycling animals.

Where the norethandrolone is to be administered over a period of two or more days by means of an implant, the implant should contain 2 or 3 fold multiples of the total dosage to be administered to insure that an adequate amount of compound enters the system of the cow over the entire treatment period. Thus the copolymer implants previously mentioned for use over about a 16 day treatment period desirably each contain at least about 200 mg. and preferably 300 mg., of norethandrolone. A convenient size of implant used has been found to be cylindrical in shape having a diameter of 0.5 centimeters and a length from 1 to 10 centimeters.

The following examples are given by way of illustrating the invention and are not to be construed as limiting. Unless otherwise indicated, amounts of material given in parts are parts by weight.

EXAMPLE 1

127 grams of crystalline norethandrolone is micronized to a product having a particle size of about 1 to 5 microns. The preparation is then mixed with 1125 parts of crystalline sorbitol, 25 milliliters of sorbitan monooleate polyoxyethylene and sufficient water for injection is added to the mixture to bring the volume up to 2500 milliliters. The resulting mixture is stirred for about 5 hours to afford a composition containing about 50 milligrams norethandrolone per milliliter, which is filled into vials.

EXAMPLE 2

An aqueous diluent is prepared consisting of 5 mg. sodium carboxymethylcellulose, 5.5 mg. sorbitan monooleate polyoxyethylene, 1.8 mg. methyl p-hydroxybenzoate and 0.2 mg. propyl p-hydroxybenzoate per milliliter in water for injection. To 100 grams of norethandrolone which has been micronized to a particle size of less than 5 microns, there is added sufficient aqueous diluent to bring the volume up to 1 liter. The resulting mixture is stirred for about 1 hour to afford a suspension containing 100 mg. norethandrolone per milliliter.

EXAMPLE 3

To a solution of 7.5 grams of norethandrolone in 100 ml. of acetone, there is added 400 ml. of an aqueous suspension containing 2% by weight of lecithin. The mixture is stirred rapidly for about 3½ hours at 70° C., then filtered. The material remaining on the filter is washed with water then air-dried for about 48 hours to afford the lecithin coated steroid. To 5.3 grams of a latter composition there is added sufficient sterile distilled water containing 0.5% by weight lecithin and 0.3% by weight sodium carboxymethylcellulose to bring the volume up to 170 milliliters. To 20 ml. of the resulting suspension is added sufficient sterile distilled water containing 0.3% by weight carboxymethylcellulose and 0.5% by weight lecithin to bring the volume up to 60 ml. The resulting suspension is poured into vials.

EXAMPLE 4

To 20.9 grams of norethandrolone there is added 500 ml. of ethanol and the mixture is stirred until solution is complete, thus affording a composition containing about 16 grams of norethandrolone per 400 ml.

EXAMPLE 5

To 6.3 grams of norethandrolone there is added sufficient corn oil to bring the volume up to 2.4 liters. The resulting mixture is heated to about 50° C. and maintained therewith stirring until solution is completed. The resulting mixture is filtered through a medium porosity sintered glass filter, then poured into vials to afford a composition containing about 2.5 mg. norethandrolone per ml.

EXAMPLE 6

10.5 grams of norethandrolone is triturated with 20 ml. of benzylalcohol then sufficient sesame oil is added to the mixture to bring the volume up to 1 liter. The resulting solution is then filtered to remove bacteria, to afford a composition containing about 10 mg. norethandrolone per milliliter, then poured into vials. Alternatively, corn oil can be substituted for the sesame oil.

EXAMPLE 7

To 9 grams of norethandrolone there is added sufficient propylene glycol to bring the volume up to 360 ml. The mixture is then stirred with warming until solution is completed. The resulting solution is then filtered through the sintered glass filter to afford a composition containing approximately 25 mg. norethandrolone per milliliter.

EXAMPLE 8

A mixture of 3461 parts of 2-hydroxyethyl methacrylate 34 parts of ethylene dimethacrylate and 5 parts of di(di-isopropyl) peroxydicarbonate, and 1500 parts of norethandrolone is warmed to 45° C. to effect solution. To a series of tubular polypropylene molds having an internal diameter of 5 millimeters there is added 130 parts each of the solution. The molds are then supported vertically in a hot water bath at 85° C. for ten minutes to effect polymerization. After removal from the cast, the resulting rods each are polished to a weight of 125 parts. The rods are then encased in a nylon mesh sleeve which is tied at each end of the rods.

EXAMPLE 9

A mixture of 4200 parts of 2-hydroxyethyl methacrylate, 4300 parts of ethylene dimethacrylate, 7 parts of di(di-isopropyl) peroxydicarbonate and 750 parts of norethandrolone is stirred at room temperature to effect solution. To each of a series of tubular polypropylene molds, having an internal diameter of 5 millimeters there is added 250 parts each of the solution and a braided nylon cord having a diameter of 3.5 millimeters was inserted into the liquid contained within the mold to a depth of 1.5 centimeters from the bottom. The molds are then placed in a water bath held at 75° C. for 25 minutes to effect polymerization. The resulting rods having the cord imbedded therein are removed from the mold and ground on the end to provide a point and to reduce the weight of the polymerized material to 200 parts.

EXAMPLE 10

A mixture of 3461 parts of 2-hydroxyethyl methacrylate, 34 parts of ethylene dimethacrylate, 5 parts of di(di-isopropyl) percarbonate and 1500 parts of norethandrolone is warmed to about 45° C. to effect solution. To each of a series of tubular polypropylene molds having an internal diameter of 5 millimeters and having placed therein a centered polytetrafluoroethylene mandrel having a 2 millimeter diameter, there is added 130 parts of the mixture. The molds are then placed in a water maintained at 75° C. for 20 minutes to effect polymerization. The cast tubes are then separated from the outer mold and the mandrel, then polished to a weight of 125 parts each. The tubes are then encased in polyethylene mesh sleeves, having 8 filaments per inch, to provide removal implants.

EXAMPLE 11

Twenty-five cycling heifers were divided into groups of 5 heifers each. As each heifer in a particular group was detected of estrus, it was given a single injection of an aqueous suspension containing 400 mg. of the particular test compound the following day and was thereafter observed for estrus at least three times daily until observed in estrus or for at least 100 days. In the group receiving norethandrolone as the test compound, the animals returned to estrus 26, 26, 26, 28 and 36 days (an average of 28.4 days) after injection. In the group receiving $17\alpha$-methallyl-19-nortestosterone as test compound the animals returned to estrus 31, 39, 43, 53 and 76 days (an average of 48.4 days) after injection. In the group receiving $17\alpha$-chloroethynyl-19-nortestosterone as test compound, the animals returned to estrus 36, 43, 53, 53 and 58 days (an average of 40.6 days) after injection. The five receiving 6-dehydro-6-methyl-$17\alpha$-acetoxyprogesterone as test compound returned to estrus 50, 57, 79, 80 and 85 days (an average of 70.2 days) after injection. Of the five receiving $6\alpha$-methyl-21-fluoro-$17\alpha$-acetoxyprogesterone, one returned to estrus 258 days later, and one of the other four before 365 days after injection.

EXAMPLE 12

Six dairy cows, which were in the fifth, twelfth, fourth, thirteenth, seventh and twelfth days of the cycle, respectively, were injected for 19 consecutive days with 4.8 mg. of norethandrolone in corn oil, except for the first cow which was injected for 20 days. None of the cows showed estrus during the treatment and all came into estrus on the second post-treatment day. At the first post-treatment estrus, all cows were artificially inseminated and all but one conceived. That one conceived on the second post-treatment cycle.

EXAMPLE 13

Ten cows were subcutaneously implanted, in the back, using a copolymer device of the type described in the previous examples measuring about 10 centimeters in height by 0.5 centimeter in diameter and containing 200 or 300 mg. of norethandrolone. All the implants were provided with a braided nylon withdrawal cord. Cords were secured to the skin and hair of some of the animals by means of an adhesive. In the others, an attempt was made to secure the implants in situ by tying a knot in the free ends of the cords. One of the cows whose implant was secured by a knot lost its implant and was withdrawn from the study. The implants were removed from the other 9 on the 16th day. All came into estrus 1 or 2 days after withdrawal of the implant, and were artificially inseminated. Six of the nine cows conceived to this first post-treatment insemination.

EXAMPLE 14

Sixty-seven Hereford cows which had calved between 114 and 25 days previously were randomly divided into a control lot of 22 animals and 3 test lots of 15 animals each. The animals in the first test lot were placed on daily feed containing the equivalent of 10 mg. 6-dehydro-6-chloro-16-methylene-$17\alpha$-acetoxyprogesterone per animal per day for 18 days. The cows in the second test group were implanted subcutaneously in the neck with an implant as described in the previous examples containing 200 mg. of norethandrolone and the implant was allowed to remain in place for 16 days. The cows in the third test group were placed on a daily ration containing the equivalent of 1 mg. of $17\alpha$-acetoxy-6-methyl-16-methylenepregna-4,6-diene-3,20-dione per animal per day for 14 days. The control cows were placed on the same basal ration as the cows in the test groups. As each cow in any group was detected in estrus, she was artificially inseminated. One of the cows in the second group lost its implant.

Of the 15 cows treated with 6-dehydro-6-chloro-16-methylene-$17\alpha$-acetoxyprogesterone 11 had come into estrus by 35 days after termination of treatment, the date of first estrus being 7, 8, 9, 14, 19, 25, 26, 28, 30 and 35 days after termination of treatment. Of the 14 cows retaining their norethandrolone implants, 13 came into estrus within 2 days of removal of the implant. Of the 15 animals receiving $17\alpha$-acetoxy-6-methyl-16-methylene-pregna-4,6-diene-3,20-dione, 11 had come into estrus by 35 days subsequent to termination of the treatment, 8 of these five or six days subsequent to termination of treatment and the remaining 3 more than 22 days subsequent to the termination of treatment. 18 of the 22 control animals came into estrus at various times during the approximate 3 month period in which the other animals were treated and observed.

What is claimed is:

1. A method of controlling ovulation and estrus in female bovines which comprises the parenteral administration of $17\alpha$-ethyl-19-nortestosterone to said bovines.

2. The method according to claim 1, in which the amount of compound administered is at least about 5 mg. per day.

3. The method according to claim 2, in which the compound is administered over a 16 day period.

References Cited
UNITED STATES PATENTS 3,499,445  3/1970  Reed _____ 128—260

OTHER REFERENCES

Fosgate, O. T., "Alteration and Control of Estrous Cycles in Bovines with Analogs of Testosterone," bulletin, Georgia Academy of Science 25:106–107, Apr. 20, 1967.

Vet. Bull. 33 #708 (1963).
Vet. Bull. 34 #3914 (1964).
Vet. Bull. 36 #4144 (1966).
Vet. Bull. 37 #4015, #5376 (1967).
Chem. Abstracts 53 #566e, #8425g (1959).
Chem. Abstracts 54 #11279h (1960).
Chem. Abstracts 64 #2375c (1966).
Chem. Abstracts 66 #52694 (1967).

SHEP K. ROSE, Primary Examiner

U.S. Cl. X.R.

128—260; 424—19, 22, 81